Patented Apr. 22, 1924.

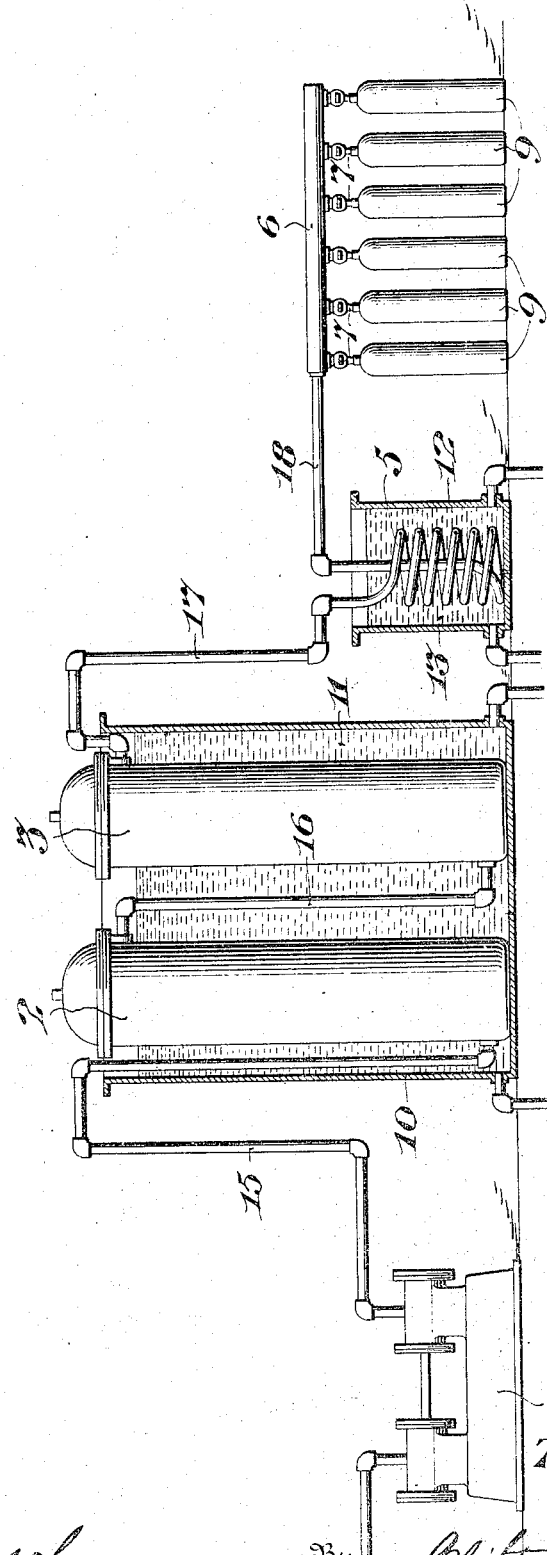

1,491,740

UNITED STATES PATENT OFFICE.

TORRENCE A. SWARTZ, OF HUGUENOT PARK, NEW YORK, ASSIGNOR TO THE S. S. WHITE DENTAL MANUFACTURING COMPANY, A CORPORATION OF PENNSYLVANIA.

ANÆSTHETIZING GAS AND METHOD OF PRODUCING THE SAME.

Application filed May 7, 1920. Serial No. 379,444.

*To all whom it may concern:*

Be it known that I, TORRENCE A. SWARTZ, a citizen of the United States, and a resident of Huguenot Park, in the county of Richmond, State of New York, have invented certain new and useful Improvements in Anæsthetizing Gases and Methods of Producing the Same, of which the following is a specification, reference being had to the accompanying drawing.

My invention relates particularly to gas commonly employed by dentists, physicians and surgeons in producing anesthetic and analgesic conditions in patients to be operated upon, and is especially directed to nitrous oxid gas.

In administering nitrous oxid gas where a long and continued flow of the gas is required, it has been found that the suspended moisture therein forms frost in the mechanism where it is reduced from the high pressure to the lower pressure suitable for administering, and that such freezing has a tendency to produce an uneven flow, and at times even check the flow of gas entirely, thereby tending to produce detrimental effects, if not serious results.

It is the object of my invention to provide a commercially satisfactory nitrous oxid gas, in which the moisture has been reduced to such a low percentage as to not interfere with the continuously smooth and regular flow of the gas while being released from the high pressure cylinder at a rate suitable for its administration or use.

Other objects of my invention are to provide a method of producing a commercially satisfactory nitrous oxid gas by which the moisture contained therein is reduced to a minimum.

Specifically stated, my invention as hereinafter described, comprehends a nitrous oxid gas which has been passed under pressure through dehydrating agents for the purpose of reducing the moisture contained therein to such an extent that the moisture remaining will not be sufficient to cause the accumulation of a deposit of frost in the mechanism where the gas is reduced from a high to a low pressure. The moisture content of such a gas may be so reduced that it will not exceed one-hundredth of one per cent.

My invention further includes all of the various novel features of the gas and the method of producing the same as hereinafter more definitely specified.

The accompanying drawing diagrammatically represents an apparatus by which the excess moisture may be extracted from the nitrous oxid gas to produce a non-freezing, free-flowing product.

The apparatus illustrated comprises the pump or two stage compressor 1, dehydrating cylinders 2 and 3, the coil 5, and manifold 6, the latter having a plurality of connection nipples 7, with which the commercial containers or cylinders 9 may be attached to be filled. The cylinders 2 and 3 may be conveniently immersed in the tank 10 of water or other suitable medium 11, and maintained thereby at a temperature above its initial temperature, which will keep the gas passing therethrough in a gaseous state.

The coil 5 is disposed in the tank or reservoir 12 of water or other cooling medium 13, maintained at a temperature requisite to effect liquefaction of said gas. The pump 1 is connected by the pipe-line 15 with the lower end of the cylinder 2, which is connected from its upper end by the pipe-line 16 with the lower end of the cylinder 3, and the upper end of said cylinder 3 is connected by the pipe-line 17 with the coil 5, which in turn is connected by the pipe-line 18 with the manifold 6.

The cylinder 2 is arranged to contain a dehydrating material, such as calcium chlorid, and the cylinder 3 is arranged to contain a dehydrating material such as lime, although obviously other dehydrating agents may be advantageously employed it being obvious that such dehydrating agents are maintained in a heated state by the bath surrounding the dehydrating cylinders 2 and 3.

The gas is forced under high pressure by the pump 1 through the pipe-line 15 into the cylinder 2, through which, by reason of its rise in temperature, it changes to a gaseous form, and passes through the pipe-line 16 and cylinder 3, from which it is directed through the pipe-line 17 into the coil 5, where it is liquefied by being cooled, and from where it passes through the pipe-line 18 to the manifold 6 to be distributed to the commercial containers or cylinders 9 through the nipples 7. Cylinders 2 and 3 are preferably heated to a temperature sufficient to heat the gas passing through them to a point above the critical temperature of the nitrous oxide gas, in which case, the gas passing through the dehydrating agent will be in gaseous form. The heated and dehydrated gas is then cooled to a point below its critical temperature by passing it through the coil 5, from where it passes through the pipe line 18, to the manifold 6, where it is distributed in liquid form to the commercial containers or cylinders 9. The pressure maintained by the pump throughout the system is sufficient to liquefy the gas after cooling in the coil 5.

Although I have described the method of dehydrating nitrous oxid gas under pressure, and have designated calcium chlorid and lime as the dehydrating agents, it is to be understood that other agents may be employed, and, therefore, I do not desire to limit my invention to the precise details and materials herein set forth, as it is obvious that various modifications may be made therein without departing from the essential features of my invention as defined in the appended claims.

Having thus described my invention, I claim:—

1. The method of producing a substantially anhydrous nitrous oxide gas, which consists in forcing said gas under pressure in a heated state through calcium chlorid and lime.

2. The method of producing a substantially anhydrous nitrous oxide gas, which consists in forcing said gas under high pressure through heated calcium chlorid and lime, the gas and dehydrating agent being maintained at a temperature above the critical temperature of the nitrous oxide gas.

3. The method of producing a substantially anhydrous nitrous oxide gas, which consists in forcing said gas under high pressure through a heated dehydrating agent, said gas being held at a temperature above the critical temperature of the nitrous oxide gas.

4. The method of producing a substantially anhydrous nitrous oxide gas, which consists in causing said gas to flow through a heated dehydrating agent under pressure, then cooling said gas.

5. A nitrous oxide gas in which the moisture content is so highly reduced that a deposit of frost will not be formed at the outlet orifice, or in the mechanism carrying the gas under high pressure, when said gas is reduced from said high pressure to a pressure sufficiently low for anesthetic purposes.

6. A highly compressed nitrous oxide gas in which the moisture content is so reduced that the gas will flow freely and continuously without formation of frost.

7. A compressed nitrous oxide gas in which the moisture content does not exceed one-hundredth of one per cent.

In witness whereof, I have hereunto set my hand this 3rd day of May, A. D., 1920.

TORRENCE A. SWARTZ.

Witnesses:
JOHN M. RICE,
CHRISTOPHER J. KAIN.